United States Patent [19]

Burton

[11] Patent Number: 4,896,430
[45] Date of Patent: Jan. 30, 1990

[54] SCANNING METHOD AND APPARATUS FOR MEASURING OPEN FLOW AREA

[75] Inventor: Clark R. Burton, Los Altos, Calif.
[73] Assignee: Compair, Inc., Burlingame, Calif.
[21] Appl. No.: 263,550
[22] Filed: Oct. 27, 1988
[51] Int. Cl.[4] ............................ G01B 3/38; G01B 5/20
[52] U.S. Cl. ...................................................... 33/552
[58] Field of Search ................. 33/530, 546, 549, 551, 33/552, 553, 554

[56]  References Cited
U.S. PATENT DOCUMENTS

| | | | |
|---|---|---|---|
| 3,464,119 | 9/1969 | Griggs | 33/552 |
| 4,322,887 | 4/1982 | Burton | 33/552 |

Primary Examiner—Harry N. Haroian
Attorney, Agent, or Firm—Robert C. Hill

[57] ABSTRACT

A scanning gauge and scanning method are disclosed for measuring the effective open area of a throat formed between adjacent vanes secured together at their ends by buttresses or the like wherein locators are mounted on an elongated guide assembly for engaging the vanes forming the throat, a scan element is arranged for traversing the elongated guide assembly in longitudinal movement along the radial length of the throat for assessing radial length thereof, a sensor head is supported by a floating mount on the scan element to remain in engagement with the trailing edge of one vane and a convex surface of the adjacent vane during sweeping movement of the scan element about an axis generally parallel to the trailing edge of the one van for assessing the shortest opening dimension at various sections along the length of the throat, longitudinal and sweeping movement of the scan element being effected by a longitudinal stepper motor and a sweep motor each including mechanical limit switches for monitoring and regulating travel of the scan element and a computer for determining the open area of the throat and for regulating operation of the motors.

35 Claims, 8 Drawing Sheets

SCANNING METHOD AND APPARATUS FOR MEASURING OPEN FLOW AREA

FIELD OF THE INVENTION

The present invention relates to a method and apparatus for measuring the effective open area of a throat formed between air foil or vane elements such as turbine stator vanes and the like. Such information is of course useful both for measuring the specific effective open area or areas in a cluster of vanes as well as for use in classifying individual vane elements.

BACKGROUND OF THE INVENTION

Various methods and gauges have been provided in the prior art for accurately measuring or determining the effective open area of vane assemblies, for example in the various stages of turbojet engines and the like.

These gauges have been concerned with the classification or measurement of such values in connection with individual vane elements or vane clusters including a plurality of guide vanes, turbine blades and/or other similar structures. For example, U.S. Pat. No. 3,464,119 issued September 2, 1969 to Griggs disclosed a precision classification gauge for classifying individual guide vanes or the like for turbojet engines in order to facilitate assembly of various stages of the engine according to predetermined values for the effective open areas of the individual vanes.

U.S. Pat. No. 3,959,886, issued June 1, 1976 also to Griggs, disclosed a similar classification gauge adapted for classifying or determining the relative effective open area for vane clusters rather than individual vane elements.

U.S. Pat. No. 4,024,646, issued May 24, 1977 again to Griggs, disclosed yet another apparatus for simultaneously gauging and aligning movable elements of guide vane assemblies including a plurality of vanes or air foil elements in order to both classify and adjust the effective open area for the vane assembly.

U.S. Pat. No. 4,374,459, issued February 22, 1983 to Burton disclosed another classification instrument for accurately measuring both blocked and/or open flow area for air foil or vane elements such as turbine stator vanes. The last noted patent was assigned to the assignee of the present invention while the other patents noted above were also of related interest to the assignee of the present invention.

U.S. Pat. No. 4,322,887, issued April 6, 1982 to Burton, disclosed yet another method and apparatus for open flow area classification, this patent also being assigned to the assignee of the present invention.

Substantial background information is set forth by the above noted patents and reference may be had to those patents for a more complete understanding of certain aspects of the present invention. Generally, it has been found important to precisely classify or measure the effective open area for individual guide vanes or for adjacent guide vanes in a cluster or assembly. This opening is also commonly referred to as the "throat" for the individual guide vanes or guide vane assemblies and, as noted above, is critically important in connection with various stages in machinery such as turbojet engines in order to assure proper performance.

U.S. Pat. No. 3,115,711, issued December 31, 1963 to Plante, disclosed yet another classification or comparison gauge adapted for use in the same manner as those of the preceding patents.

The classification gauges disclosed by the above noted patents have been found to be suitable for classifying or measuring the effective open area of individual guide vanes, vane clusters and even complete arrays of vanes or similar structures. Generally, the above noted classification gauges function to accurately position within a precision jig one portion of an air foil or vane, such as its trailing edge, portions of the vane then being contacted by multiple mechanical probes or fingers in order to classify or measure the effective open area for that vane either alone or in combination with an additional vane or vanes in a cluster.

U.S. Pat. No. 3,327,495, issued February 4, 1982 to Plante, disclosed a staging fixture for holding a single vane nozzle assembly while providing reference surfaces corresponding to surfaces provided by "ideal vanes" in order to provide an assessment of effective open area for the single vane. To the extent that the idealized surfaces provided by the fixture correspond to surfaces for additional vanes in a cluster with the one vane, a single vane arranged within such a fixture is assumed to form a throat or effective open area in the same manner as a pair of adjacent vanes according to the present invention. Accordingly, a single vane arranged within such a fixture to effectively form a throat or effective open area is also included within the context of the present invention where reference is made to adjacent vanes.

The open flow area or effective open area for a pair of vanes is established as the width or open dimension between the adjacent vanes multiplied by the effective radial length of the opening or throat between the vanes. The radial length of the throat or opening between the vanes is determined by the spacing between the buttresses or corresponding end surfaces for the throat between the two adjacent vane elements.

Furthermore, it is important to understand that the traditional values of such a vane element, including its trailing edge location, convex air foil surface, etc., are important in determining the effective open flow area as discussed above. In addition, it has been found that other factors including air foil rotation, air foil displacement and air foil twist may further affect these open area values.

In this regard, air foil rotation refers to the angular relationship between the air foil vane element and its respective buttresses or flanges. Rotation of the air foil in either a clockwise or counterclockwise direction upon the supporting buttresses results in modification of the effective open flow area values for the vane or a vane cluster including that vane.

Similarly, air foil displacement refers to the location of the air foil or vane element upon its respective buttresses. Air foil displacement is particularly concerned with relative positioning of the air foil or vane element upon its respective buttresses in a direction perpendicular to the path of air flow passed or through the individual vanes or vane assemblies.

Air flow twist refers to relative rotation between opposite ends of the individual air foil or vane elements. Relative rotation may arise, for example, during manufacturing of the vane element with buttresses formed at opposite ends of the vane or air foil. More commonly, relative rotation may be produced between the opposite ends of the vane element when its buttresses are secured in a vane assembly, for example, a stage of a turbojet engine. If the base surfaces of the opposite buttresses are not precisely aligned or if the vane surfaces to which the buttresses are attached are not properly aligned, twisting or relative rotation between the opposite ends of the vane element may result, especially at high temperatures and/or under stresses developed within the engine.

The preceding discussion is typical of other variations in vane elements which may vary their effective open area in a vane cluster. In any event, such variations further demonstrate the need for precisely measuring the effective open area for such vane elements. The gauges provided by the patents discussed above have been found effective in that regard. However, because of the large numbers of vanes or vane clusters requiring such analysis, there has been found to remain a need for a further improved method and apparatus for measuring their effective open area.

In the prior art designs discussed above, a unique tool or device was needed for each variation of vanes. Accordingly, there was also found to remain a need for a more universal, adjustable tool or scanning gauge, particularly for use in engine development and the like, where vane sizes and shapes may be changed during development while facilitating the measurement of an effective open area in vane clusters including those vanes.

SUMMARY OF THE INVENTION

It is therefore an object of the invention to provide an improved scanning method and apparatus or gauge for measuring the effective open area of a throat formed between adjacent vanes in a vane cluster or assembly.

It is a more particular object of the invention to provide an improved scanning gauge including an elongated guide assembly with locators for positioning the guide assembly on the vanes forming the throat, a scan element being arranged for traversing the elongated guide assembly in longitudinal movement along the radial length of the throat for assessing radial length, a sensor head being arranged on the scan element for sweeping movement about an axis generally parallel to the vanes for assessing the minimum dimensional opening between the vanes along the length of the throat, the radial length and minimum dimensional opening providing means for determining the effective open area for the throat.

Preferably, the scanning gauge is employed together with a computer operatively coupled with the scan element and the sensor head for determining the open area of the throat.

More preferably, a stepper motor means is mounted on the elongated guide assembly for controlling longitudinal movement of the scan element, the sensor head including transducer means for assessing the minimum dimensional opening, the computer being operatively coupled with the stepper motor means and transducer means for determining the effective open area of the throat.

Even more preferably, the scanning gauge includes a sweep motor means for controlling sweeping movement of the sensor head, the computer being operatively coupled with the sweep motor means as well as the longitudinal motor means in order to regulate both longitudinal and sweeping movement.

It is an even further object of the invention to provide a scanning gauge as described above wherein the sensor head is mounted on the scan element by a floating mount means permitting two-dimensional movement of the sensor head for maintaining constant engagement of the probes with the vanes during both longitudinal and sweeping movement. Preferably, both longitudinal and sweeping movement of the scan element and sensing head are regulated by respective limit switches.

It is a further related object of the invention to provide a scanning method and gauge for measuring the effective open area of a throat formed between vanes secured together at their ends, the gauge including guide means with locators for positioning the guide means on the vanes, scanning means arranged for longitudinal and sweeping movement on the guide means for respectively assessing radial length of the throat and for rotation about an axis parallel to the trailing edge of one vane for assessing the minimum dimensional opening between the trailing edge of the one vane and a convex surface of the adjacent vane along the length of the throat. The scanning method and gauge further contemplate means, preferably a computer, responsive to longitudinal and sweeping movement of the scanning means for determining or measuring the open area of the throat.

Preferably, the scanning means includes relatively movable probe means for respectively engaging the trailing edge of the one vane and the convex surface of the adjacent vane during longitudinal and sweeping movement of the scanning means for determining the effective open area of the throat.

Even more preferably, the relatively movable probe means are arranged on a sensor head mounted on the scanning means by a floating mount means permitting two-dimensional movement of the sensor head in order to constantly maintain the probes in engagement with the vanes.

Additional objects and advantages of the invention are made apparent in the following description having reference to the accompanying drawings.

DESCRIPTION OF THE PREFERRED EMBODIMENT

Referring now to the drawings and particularly to FIGS. 1-5, a scanning gauge constructed according to the present invention is generally indicated at 20. The basic features of the scanning gauge 20 are summarized immediately below followed by a more detailed description of the scanning gauge and its components and a description of the method of operation for the scanning gauge.

Figure 9:
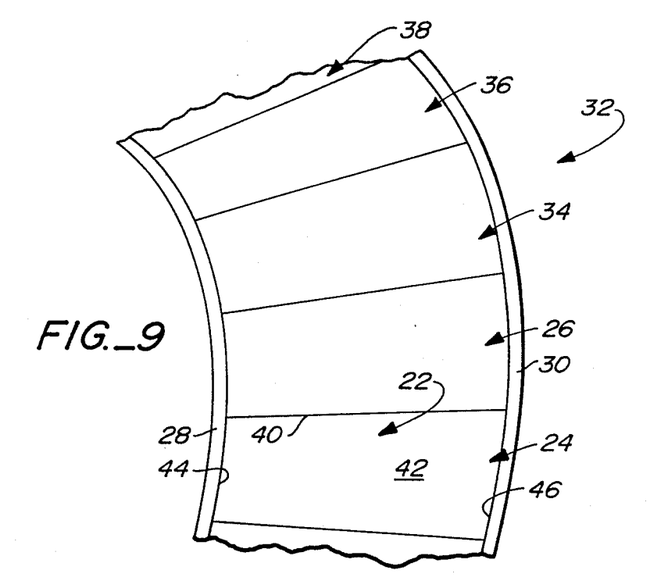
FIG. 9 illustrates a vane cluster with two vanes forming a throat, the effective open area of which is measured by the present invention, additional vanes in the cluster preferably providing trailing support for the scanning gauge.

The scanning gauge 20 is adapted for measuring the effective open area of a generally rectangular throat formed by adjacent vane elements. Referring particularly to FIG. 9, a throat is indicated at 22 as being formed between adjacent vane elements 24 and 26 secured together by buttresses 28 and 30 in a vane cluster 32 also including additional vane elements 34, 36 and 38. More specifically, the throat 22 is formed between a trailing edge 40 of the vane element 26, an adjacent convex surface 42 of the vane element 24 and radial end surfaces of the throat indicated at 44 and 46. The radial end surfaces 44 and 46 are respectively formed by the buttresses 28 and 30.

Referring again specifically to FIGS. 1-5, the scanning gauge 20 includes an elongated guide assembly 48 formed by guide rods 50 and 52 rigidly interconnected between inner and outer frame plates 54 and 56. Inner and outer locators or fingers 58 and 60 are respectively mounted on an inner locator plate 62 and the outer frame plate 56 for engaging the trailing edge of one vane element, preferably the trailing edge 40 of the vane element 26. A trailing locator foot 64 is also mounted on the inner locator plate 62 and extends outwardly or rearwardly from the elongated guide assembly 48 for engaging the trailing edge of one or more of the additional vane elements 34-38. The vane elements 24, 26 and 34-38 of the vane cluster 32 are also schematically represented in FIG. 3.

A scan element 66 is arranged for travel along the guide rods 50 and 52 generally in a longitudinal path corresponding to a radial length of the throat 22 between the end surfaces 44 and 46 (see FIG. 9).

Longitudinal scanning movement of the scan element 66 is controlled by a stepper-type scan motor 68 mounted on a motor plate 70 and operatively coupled with the scan element 66 by an elongated drive screw 72. Through this arrangement, as described in greater detail below, the scan motor 68 is operable for causing the scan element 64 to move longitudinally back and forth between the end surfaces 44 and 46 which are radially spaced apart from each other in the vane cluster 32 (see FIG. 9) to form the throat 22.

Figure 5:
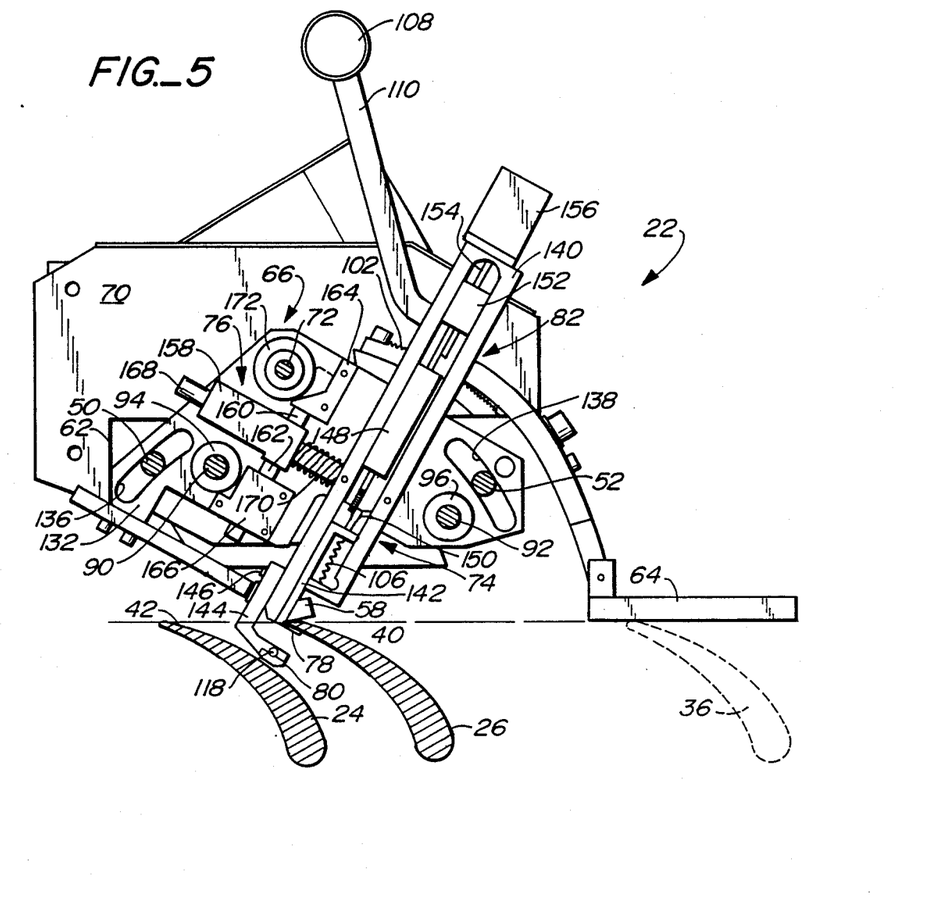
FIG. 5 is a view taken along section line V—V in FIG. 3 to better illustrate a floating mount arrangement permitting two-dimensional movement of a sensor head on the scan element for maintaining constant engagement of relatively movable probes with the vanes during both longitudinal and sweeping movement.

Referring particularly to FIG. 5, a sensor head 74 is arranged for two-dimensional or X-Y movement on the scan element 66 by means of a floating mount assembly generally indicated at 76.

Relatively movable probes 78 and 80 are mounted on the sensor head 74 for engagement respectively with the trailing edge 40 of the one vane 26 and the convex surface 42 of the adjacent vane element 24 (see FIG. 9). Relative movement of the probes 78 and 80 is sensed by a transducer assembly 82 mounted on the sensor head 74.

Figure 5A:
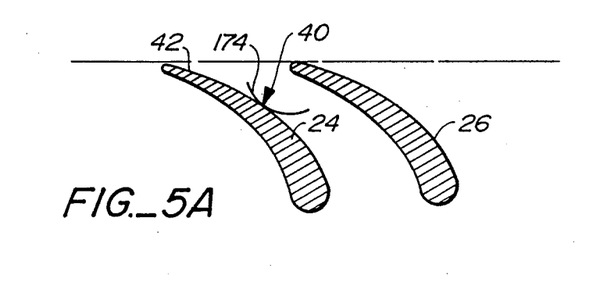
FIG. 5A is an enlarged fragmentary view in section of the adjacent vane elements forming the throat 22 in order to more clearly illustrate the minimal dimensional opening to be measured by sweeping operation in the scanning gauge of the invention.

It is a particularly important feature of the invention to adapt the scanning gauge 20 so that the probes 78 and 80 measure a minimum dimensional opening 84 between the trailing edge 40 and convex surface 42 in various sections along the radial length of the throat in order to more accurately assess the effective open area for the throat. The minimum dimensional opening 82 is best represented in FIG. 5A.

In order to assure that the probes 78 and 80 are appropriately engaged with the trailing edge 40 and the convex surface 42, the scanning gauge 20 additionally provides for sweeping movement of the scan element 66 generally about an axis of rotation corresponding to the trailing edge 40.

Figure 1:
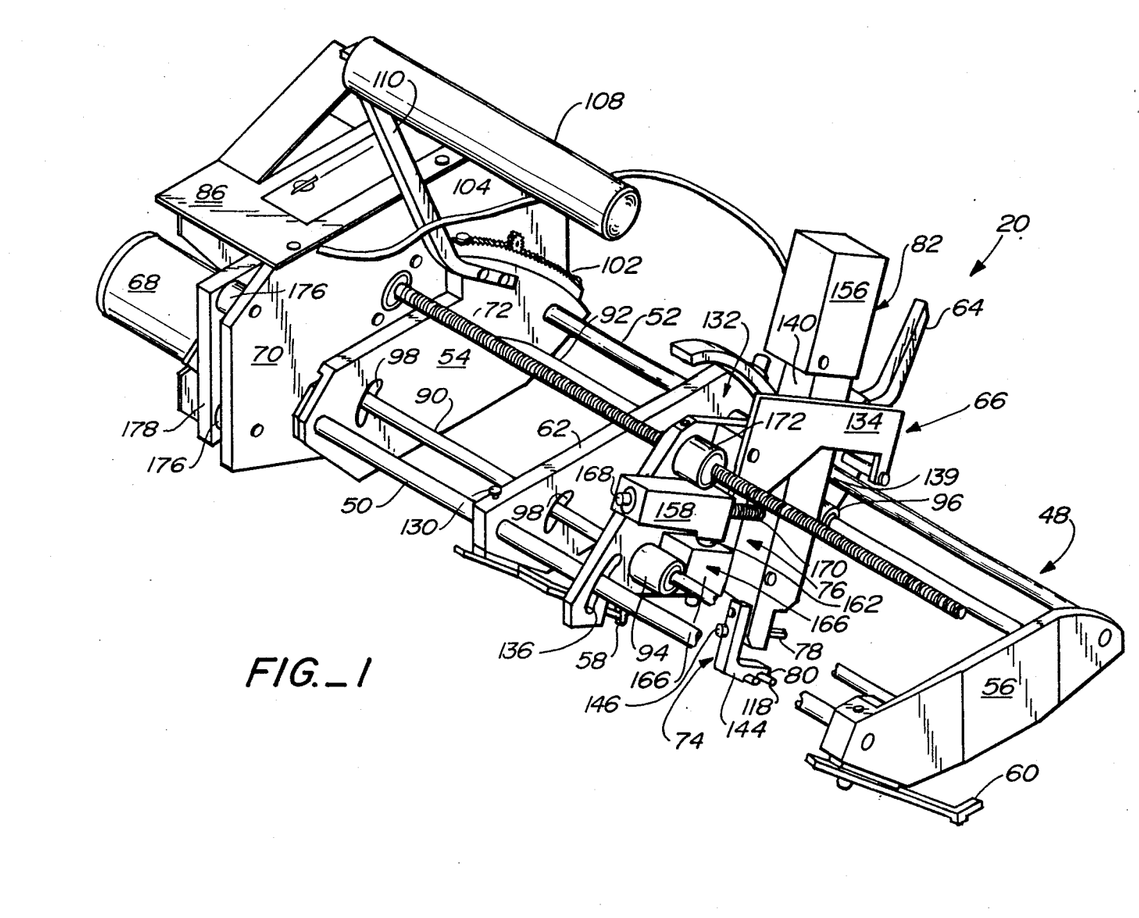
FIG. 1 is a pictorial representation of a scanning gauge constructed according to the present invention for measuring the effective open area of a throat formed between the vanes.

A cover plate 86 is shown on the left end of the scanning gauge in FIG. 1 but is removed in the other figures to better illustrate various components of the gauge.

Sweeping movement of the scan element 66 is controlled by a sweep motor 88. Sweeping movement of the scan element 66 is accomplished by relative rotational movement between the elongated guide assembly 48 and the motor plate 70 upon which the sweep motor 88 is mounted. The scan element 66 is mounted on scan rods 90 and 92 by bushings 94 and 96 so that the scan element 66 is precisely rotated by the scan rods 90 and 92 while being able to longitudinally traverse the scan rods 90 and 92 under the control of the drive screw 72.

Figure 6:
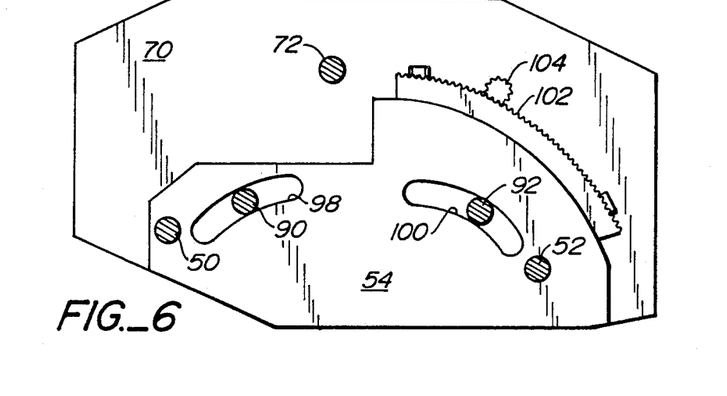
FIG. 6 is a view taken along section line VI—VI in FIG. 3 to illustrate a rack and pinion assembly operable by the sweep motor for controlling sweep movement of the scan element.

The scan rods 90 and 92 are rigidly interconnected with the motor plate 70 and extend through arcuate slots 98 and 100 in the inner frame plate 54 and inner locator plate 62 as may be best seen in FIGS. 1 and 6.

Relative rotational movement between the motor plate 70 and the inner frame plate 54 of the elongated guide assembly 48 is produced by means of a rack 102 mounted on the inner frame plate 54 and a pinion 104 mounted on the motor plate 70 and driven by the sweep motor 88. The rack and pinion assembly is arranged for producing rotational or sweeping movement of the motor plate 70 and accordingly the scan element 66 about an axis generally corresponding to the trailing edge 40 of the vane element 26. Since the locators 58 and 60 are arranged for engagement with the trailing edge 40 of the vane element 26, it is thus apparent that sweeping movement also tends to rotate about an axis between those two elements as well as the probe 78 (described in greater detail below).

During sweeping movement of the scan element 66, the probes 78 and 80 are urged apart from each other by means of a spring 106. Simultaneously, the probes 78 and 80 are caused to remain in respective engagement with the trailing edge 40 and the convex surface 42 during sweeping movement of the scan element 66 because of the two-dimensional freedom of travel provided by the floating mount assembly 76.

Furthermore, during sweeping movement of the scan element 66 with the probes 78 and 80 maintained in engagement with the trailing edge 40 and the convex surface 42, the transducer assembly 82 is adapted for assessing the minimum dimensional opening 84 between those surfaces, as is also described in greater detail below.

During each scanning operation, the scanning gauge 20 is preferably maintained in appropriate engagement with the vane elements of the cluster 32, for example, by means of a handle 108 mounted on the inner frame plate 54 by means of a bracket 110.

Figure 10:
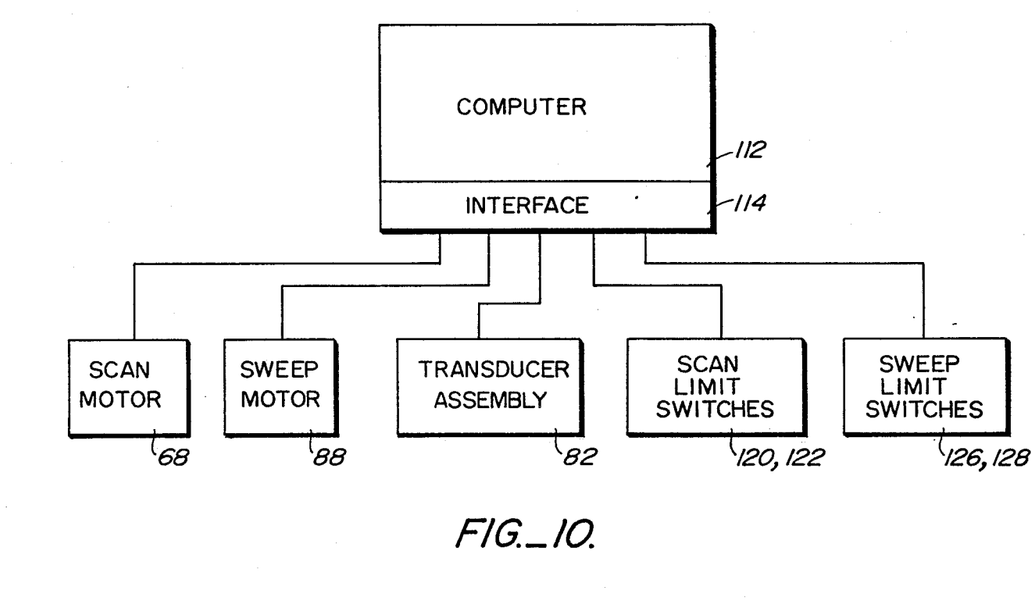
FIG. 10 is a block diagram of a computer coupled with the motors, transducer assembly, limit switches and other gauge components as necessary for the present invention.

Referring momentarily to FIG. 10, a computer 112 is interconnected with the stepper-type scan motor 68, the stepper-type sweep motor 88, the transducer assembly 82 and both scan and sweep limit switches as described below. Preferably, those elements are interconnected with the computer 112 through a gauge interface generally indicated at 114.

The computer 112 includes appropriate programming for receiving data from the scan motor 68 in order to accurately assess the radial length of the throat 22 according to longitudinal or scanning travel of the scan element 66 between the end surfaces 44 and 46. The computer 112 is also interconnected with the transducer assembly 82 so that it can assess the minimum dimensional opening 84 between the trailing edge 40 and convex surface 42 at a number of sections along the radial length of the throat 22.

Preferably, the computer 112 is interconnected with both the scan motor 66 and sweep motor 88 as well as the limit switches so that it can automatically regulate longitudinal traversing and/or scanning travel of the scan element 66 through the radial length of the throat 22 while also automatically regulating sweeping movement of the scan element 66 by operating the sweep motor 88 at selected sections along the length of the throat 22. Because of the interconnection of the computer 112 with both the sweep motor 88 and the transducer assembly 82, as well as the limit switches, the computer 112 is also capable of controlling sweeping movement of the scan element 66 to accurately assess the minimum dimensional opening 84 at each section.

Given this data, the computer 112 is further programmed to determine the effective open area for the throat 22 as the product of its radial length and average minimum dimensional opening.

Programming of the computer 112 to accomplish both the calculating and regulating steps described above is believed to be obvious to those skilled in the art and accordingly is not described in greater detail for purposes of the present invention.

Ball-shaped probes 116 and 118 are arranged on opposite sides of the sensor head 74 for respective engagement with the radial end surfaces 44 and 46 of the throat 22.

Figure 7:
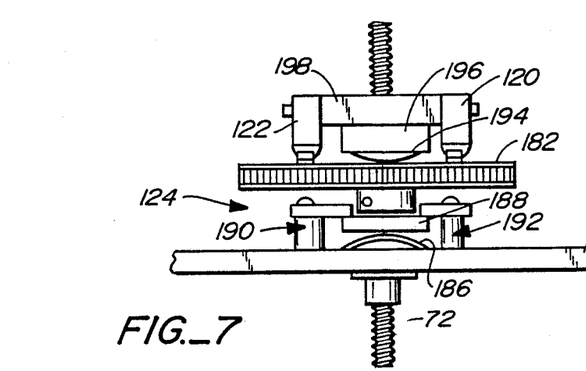
FIG. 7 is a view taken along section line VII—VII in FIG. 4 for better illustrating scan limit switches to terminate operation of the scan motor.

Limit switches 120 and 122 are also arranged for actuation to terminate operation of the scan motor 68 when one of the probes 116 or 118 engages the corresponding radial end surface 44 or 46. Referring particularly to FIG. 7, the limit switches 120 and 122 are operatively coupled with the drive screw 72 by a spring assembly 124 described below. When one of the probes 116 or 118 engages the respective radial end surface of the throat 22, scanning movement of the scan element 66 is resisted so that tension is produced within the drive screw 72 and transferred through the spring assembly 124 for operating one of the limit switches 120 and 122.

Through this arrangement, the interconnection of the computer 112 with the scan motor 68 is effective for accurately assessing radial length of the throat since operation of the scan motor 68 corresponds to longitudinal scanning of the scan element 66 through the throat because of the limit switches 120 and 122.

Figure 8:
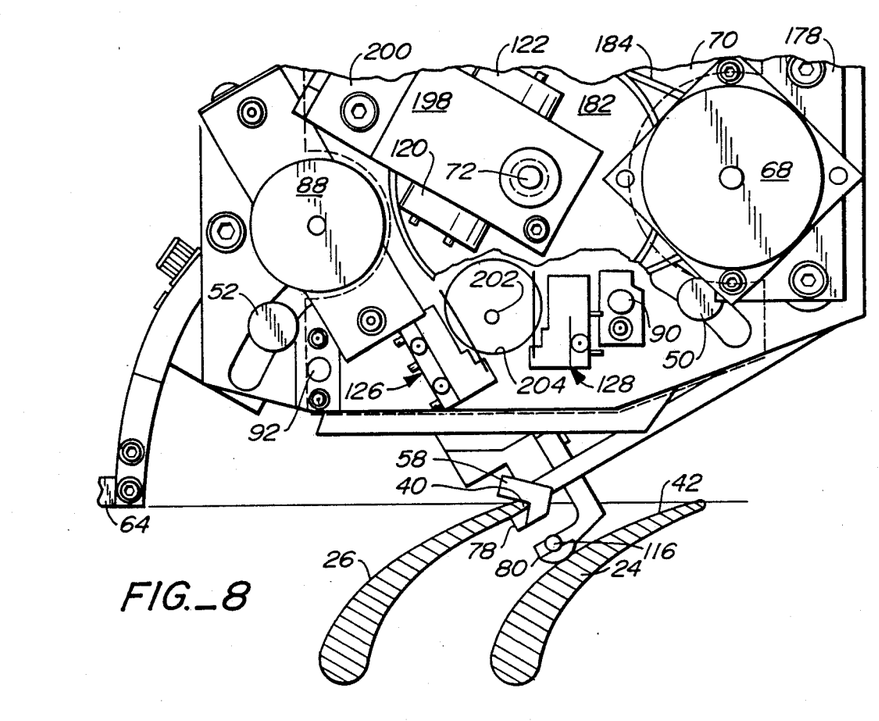
FIG. 8 is an enlarged fragmentary view taken from the left side of FIGS. 2 and 3, similar to portion of FIG. 4 but with parts broken away to better illustrate sweep limit switches for respectively limiting clockwise and counterclockwise rotation of the scan element relative to the elongated guide assembly.

Additional limit switches 126 and 128 are also interconnected with the sweep motor 88 and are positioned for limiting sweeping travel of the scan element 66 in clockwise and counterclockwise directions respectively. The limit switches 126 and 128 are arranged as illustrated in FIG. 8 in order to limit relative rotational or sweeping movement between the inner frame plate 54 and the motor plate 70 which are interconnected by the rack and pinion 102 and 104.

Construction of the scanning gauge 20 is described in greater detail below to assure a complete understanding of the invention.

Initially, the inner frame plate 54 and outer locator plate 56 are rigidly secured to the guide rods 50 and 52 as described above. The inner locator plate 62 is secured to the guide rods by a screw indicated at 130 in FIG. 1. Thus, the inner frame plate 54 and outer locator plate 56 are rigidly connected to the guide rods 50 and 52 to constantly maintained the rectangular geometry of the elongated guide assembly. However, the inner locator plate 62 may be repositioned upon the guide rods 50 and 52, if necessary, for example in order to assure proper engagement of the locators 58 and 60 with vane clusters of different dimensions or configurations. The locators 58 and 60 are also preferably adjustable or replaceable upon the inner locator plate 62 and outer frame plate 56 in order to even further adapt the scanning gauge 20 for use with a variety of vane clusters or assemblies.

The scan element 66 is fabricated with spaced apart scan plates 132 and 134 to assure proper alignment of the scan element 66 and sensor head 74 during both scanning and sweeping movement. Referring particularly to FIG. 5, the scan plate 132 is formed with arcuate slots 136 and 138 for permitting the guide rods 50 and 52 to pass through the scan element 66 without interference during sweeping movement of the scan element.

The sensor head 74 includes a fabricated housing 140, having a cover 139 (the cover being shown in FIG. 1 and removed in the other figures to illustrate the internal components), for receiving the transducer assembly 82 in an upper portion thereof.

The probe 78 is preferably notched for engagement with the trailing edge 40 and is attached to an elongated element 142 slidably mounted in a lower end of the housing 140 for capturing the spring 106. The other probe 80 is relatively pointed for engagement with the convex surface 42 of the vane element 24. The probe 80 is mounted on another elongated element 144 replaceably attached to the housing 140, for example by screws 146, to permit replacement of the sensor 80 and adaptation of the scanning gauge 20 for use with a wide variety of vane clusters or assemblies.

The transducer assembly 82 includes a transducer 148 arranged in an upper end of the housing 140 and interconnected with the probe mounting element 142 by an interconnecting link 150 to assure response of the transducer to movement between the probes 78 and 80. In the upper end of the housing 138, the transducer is coupled with a tapped block 152. A threaded rod 154 passes through the block 152 and engages a retracting motor 156 which is thus operable by the computer for retracting the probe 78 as necessary during operation of the scanning gauge. As illustrated in FIG. 5, the probe 78 is "retracted" by shifting it toward the other probe 80. The computer 112 is coupled with both the motor 156 and transducer 148.

As noted above, the floating mount assembly 76 permits two-dimensional freedom of movement for the sensor head 74 during sweeping movement of the scan element 66. For accomplishing this purpose, the floating mount assembly 76 includes a floating block 158 slidably mounted on rods 160 and 162 which are secured to the scan plate 132 by brackets 164 and 166.

Another rod 168 extends longitudinally through the floating block 158 and is connected to the housing 140. A compression spring 170 surrounds the rod 168 for interaction between the floating block 158 and housing 140. Through this arrangement, the sensor head 74 is free for two-dimensional movement as noted above with force of the spring 168 urging the sensor head rearwardly and gravity urging the sensor head downwardly as viewed in FIG. 5 to assure proper engagement of the probes 78 and 80 with the trailing edge 40 and convex surface 42.

Figure 2:
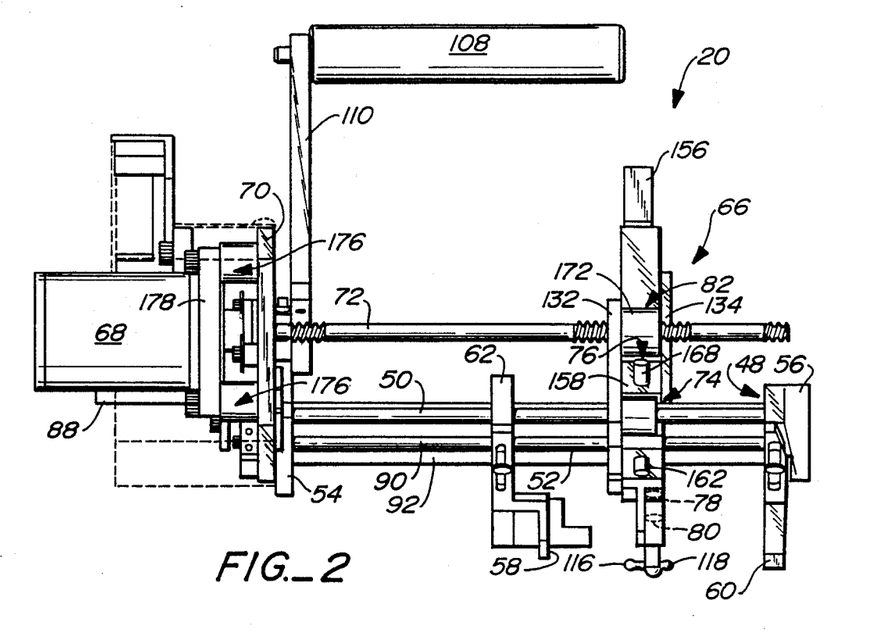
FIG. 2 is a front view in elevation of the scanning gauge.
Figure 3:
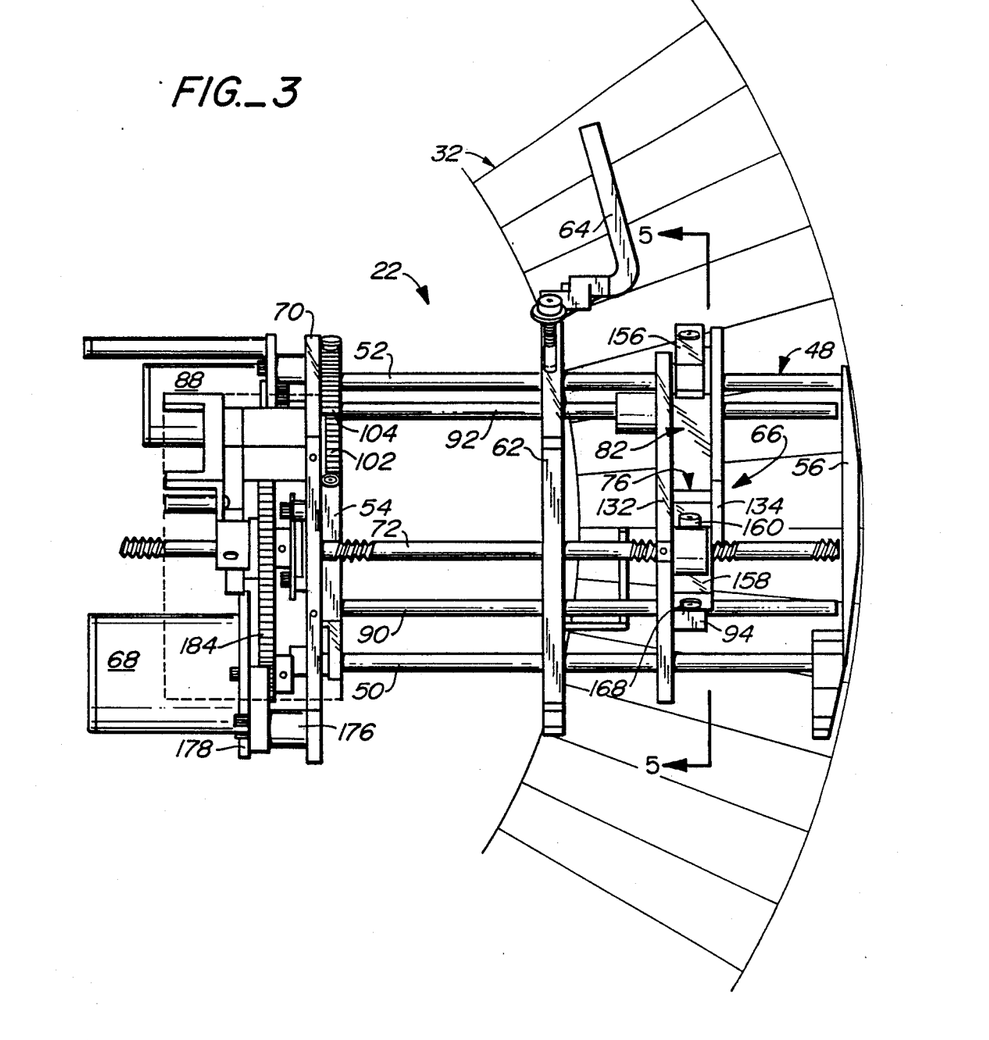
FIG. 3 is a plan view of the scanning gauge to better illustrate arrangement of the scan element on an elongated guide assembly for longitudinal movement along the radial length of a throat formed between the vanes.

Referring also to FIGS. 2 and 3, a threaded bushing 172 is secured to an upper portion of the scan plate 132 for receiving the drive screw 72. Thus, rotation of the drive screw 72 by operation of the scan motor 68 causes the scan element 66 to move back and forth on the elongated guide assembly as described above.

Figure 4:
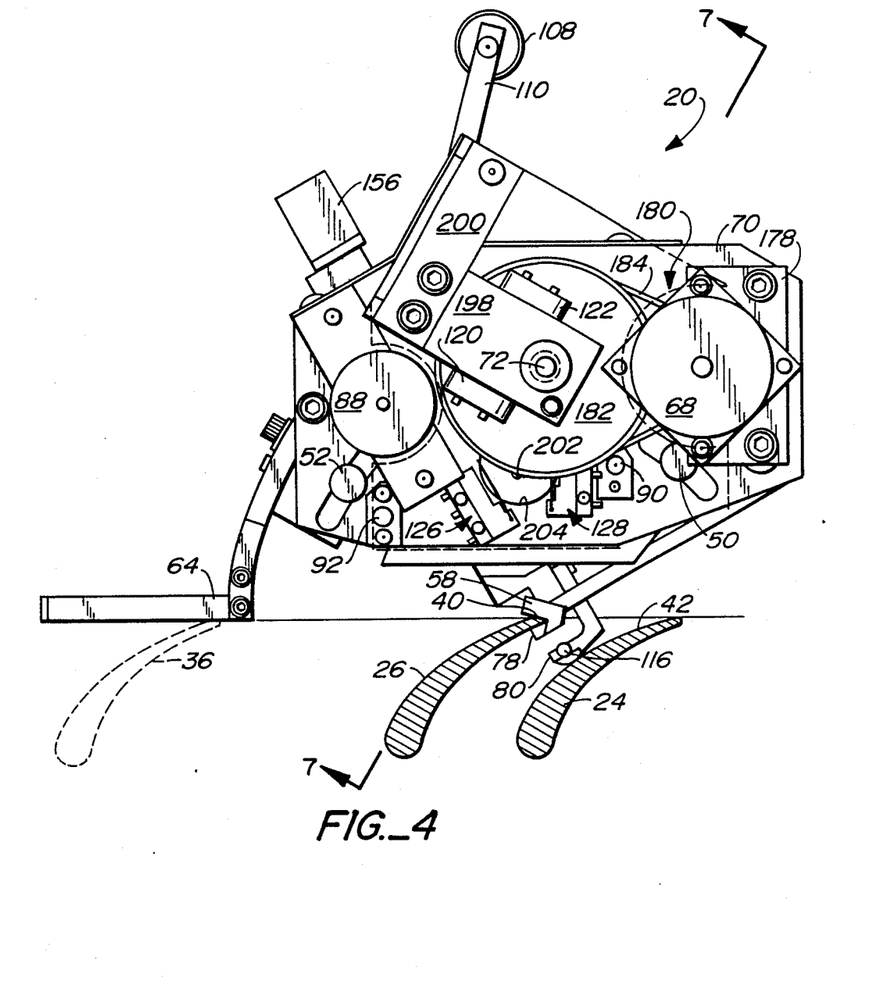
FIG. 4 is a view taken from the left side of FIGS. 2 and 3 to better illustrate a longitudinal scan motor and sweep motor arranged on the elongated guide assembly for respectively effecting longitudinal and sweeping movement of the scan element.

As may be best seen in FIGS. 1 and 6, the rack 102 and pinion 104 are arranged respectively upon the inner frame plate 54 and motor plate 70. The rack 102 is secured to the locator plate 54 by screws 174. The pinion 104 extends through the motor plate 70 for engagement with the sweep motor 88 as illustrated in FIG. 4. Thus, clockwise and counterclockwise operation of the sweep motor 88 causes the pinion 104 and accordingly the motor plate 70 to sweep or rotate about the axis of the trailing edge 40 as described above. With the scan element 66 being coupled with the motor plate by means of the scan rods 90 and 92, both the scan element 66 and the sensor head 74 are thus driven in sweeping movement. Sweeping movement of the scan element 66 acts in combination with the floating mount of the sensor head 74 to effectively shift the probe 80 along an arcuate path 174 (see FIG. 5A) while the other probe 78 is urged upwardly and rearwardly against the trailing edge 40. Thus, the combination of the probes 78 and 80 together with the transducer assembly 82 permits assessment of the minimum dimensional opening 84 between the trailing edge 40 and arcuate surface 42, as may be best seen in FIG. 5A.

Referring now to FIGS. 3 and 4, the scan motor 68 is mounted in spaced apart relation from the motor plate 70 by spacers 176 and a mounting bracket 178 to align a drive pulley 180 on the scan motor 68 with a large pulley 182 secured in driving relation with the drive screw 72. A drive belt 184 is trained about the pulleys 180 and 182 for connecting the scan motor 68 in driving relation with the drive screw 72.

Referring also to FIG. 7, the large pulley 182 is maintained in a normal axial position, as shown, by the spring assembly 124. The spring assembly 124 includes a stronger or dominant spring 186 arranged between the motor plate 70 and a thrust washer 188 bearing on the pulley 182 and limited from movement toward the pulley by T-pin restrainers 190 and 192. A weaker spring 194 bears on the other side of the pulley 182 and is supported by a spacer 196 mounted on an aligning plate 198. The aligning plate 198 is secured to the motor plate 70 by a spacer bracket 200 (see FIG. 8) which also contains an electrical connector (not shown) for connection with the computer as generally illustrated by the block diagram of FIG. 10.

The scan limit switches 120 and 122, one of which is normally open and one of which is normally closed, are mounted on the aligning plate 198 for engagement with the pulley 182.

Thus, when one of the probes 116 and 118 (see FIGS. 1 and 2) engages a radial end of the throat 22 (see FIG. 9), tension produced in the drive screw 72 causes the pulley 182 to shift against one of the springs 186 and 194 to actuate one of the scan limit switches 120 and 122 to terminate operation of the scan motor 68.

As noted above, the sweep motor 88 is also mounted on the motor plate 70 in rotating engagement with the pinion 104 for regulating sweeping operation of the rack 102 and pinion 104 as also described above.

The limit switches 126 and 128 are reed-type switches which function in response to an actuator 202 for terminating or interrupting operation of the sweep motor 88 in either a clockwise or counterclockwise direction. The actuator 202 is a pin connected to the inner frame plate 54 and extending through an opening 204 in the motor plate 70. Thus, the actuator pin 202 engaged the limit switches 126 and 128 to effectively limit sweeping rotation or movement of the scan element 66 and particularly the sensor head 74 to a selected angular sector relative to its axis of rotation formed by the trailing edge 40.

The method of operation for the scanning gauge 20 is believed apparent from the preceding description. However, the method of operation is described briefly below in order to assure a more complete understanding of the invention.

Initially, the locators 58 and 60 as well as the probes 78 and 80 on the sensor head 74 are selected for use with a particular vane element combination or cluster such as that indicated at 32 in FIG. 9. The scanning gauge is carefully calibrated by means of a calibrating tool or tools of known dimension (not shown) engaged with the probes 78 and 80 to provide calibrating data to the computer 112.

The scanning gauge 20 is then positioned in engagement with the vane cluster 32 so that the locators 58 and 60 are firmly in engagement with the trailing edge 40 adjacent the radial ends for the throat 22 formed between the vane elements 24 and 26. At the same time, the trailing locator foot 64 is positioned on an adjacent vane element, for example that indicated in phantom at 36 in FIG. 4 in order to better stabilize the scanning gauge during operation.

The scanning gauge 20 is preferably maintained in this operating position by a user applying downward pressure through the handle 108. The handle 108 provides a simple means for securing the scanning gauge 20 in place but could obviously be replaced, for example, with a more complex mechanism.

With the scanning gauge 20 properly positioned as described above, the computer 112 of FIG. 10 is operatively coupled with the scan motor 68, the sweep motor 88, the limit switches and the transducer assembly 82 in order to calculate the effective open area of the throat 22 with operation of the scan motor 68 and sweep motor 88 being regulated either manually or automatically by the computer 112. The computing function of the scanning gauge 20 and computer 112 is described in greater detail below.

Initially, the scan element 66 is shifted longitudinally to locate either of its probes 116 or 118 in engagement with the respective radial end surfaces 44 or 46 (see FIGS. 2 and 9). Assuming that the scan element 66 is initially shifted to the right as viewed in FIG. 2 with the probe 118 in engagement with the radial end surface 46, the scan motor 68 is then operated for rotating the drive screw 72 in clockwise fashion as viewed in FIG. 5 to shift the scan element 66 in a leftward scanning direction of movement as viewed in FIGS. 2 and 3.

Scanning movement of the element 66 is continued until the other sensor 116 engages the opposite radial end surface 44. At that time, operation of the scan motor 68 is terminated or interrupted by operation of one of the limit switches 120 and 122 as described above. The effective radial length of the throat 22 is assessed by the computer 112 because of the stepper function of the motor 68.

During longitudinal scanning of the element 66 along the radial length of the throat 22, the sweep motor 88 is operated at predetermined intervals by the computer 112 or at intervals selected by an operator to initiate relative rotation between the motor plate 70 and inner frame plate 54 through the rack 102 and pinion 104 as described above. This results in sweeping movement of the scan element 66, preferably with the lower probe 80 on the sensor head 74 being caused to move in sweeping relation about the arc 174 illustrated in FIG. 5A.

During each sweeping operation of the sensor head 74, data transmitted to the computer 112 from the transducer assembly 82 permits the computer 112 to assess the minimum dimensional opening 84 for each selected section along the length of the throat 22.

After completion of the scanning movement of the scan element 66 with sweeping motion of the sensor head 74 at selected intervals as described above, the computer 112 is provided with sufficient data to very precisely calculate the effective open area for the throat 22. As noted above, the effective open area equals the product of the radial length of the throat 22 and the average minimum dimensional opening for all of the sections where sweeping operation was accomplished as noted above.

Accordingly, there has been described a preferred construction and method of operation for a scanning gauge to precisely measure effective open area of a throat formed between vane elements secured together in spaced apart relation, for example by buttresses. Numerous modifications and variations will be apparent from the preceding description in addition to the modifications and variations specifically noted above. Accordingly, the scope of the invention is defined only by the following appended claims.

What is claimed is:

1. A scanning gauge for measuring the effective open area of a throat formed between vanes secured together at their end by buttress means, comprising
an elongated guide assembly,
locators mounted on the elongated guide assembly for engaging the vanes forming the throat, and
a scan element arranged for traversing the elongated guide assembly in longitudinal movement along the radial length of the throat for assessing its radial length, a sensor head arranged on the scan element for sweeping movement about an axis generally parallel to the vanes for assessing a minimum dimensional opening between a trailing edge of one vane and a convex surface of an adjacent vane along the length of the throat, longitudinal movement along the radial length of the throat and the minimum dimensional opening along the length of the throat providing values for determining the open area of the throat between the vanes.

2. The scanning gauge of claim 1 further comprising a a computer operatively coupled with the scan element and the sensor head for determining the open area of the throat between the vanes.

3. The scanning gauge of claim 1 further comprising a stepper motor means for controlling longitudinal movement of the scan element, probes on the sensor head for engaging the trailing edge of the one vane and the convex surface of the adjacent vane, and transducer means operatively coupled with the probes for assessing the minimum dimensional opening, the computer being operatively coupled with the stepper motor means and transducer means for determining the open area of the throat between the vanes.

4. The scanning gauge of claim 3 further comprising a sweep motor means for controlling sweeping movement of the sensor head on the scan element, the computer also being operatively coupled with the sweep motor means as well as the longitudinal motor means to automatically regulate logitudinal movement of the scan element and sweeping movement of the sensor head.

5. The scanning gauge of claim 1 wherein the locators and probes are adjustable or replaceable for use with a variety of vanes.

6. The scanning gauge of claim 1 wherein the locators include inner and outer locators for engaging radially spaced apart portions of one vane and a trailing locator for engaging an additional vane.

7. The scanning gauge of claim 1 wherein the elongated guide assembly comprises guide rods rigidly connected to frame plates, the scan element being mounted for traversing movement on the guide rods.

8. The scanning gauge of claim 7 further comprising relatively movable probes on the sensor head for engaging the trailing edge of the one vane and the convex surface of the adjacent vane, and floating mount means permitting two-dimensional movement of the sensor head on the scan element for maintaining constant engagement of the relatively movable probes with the trailing edge of the one vane and the convex surface of the adjacent vane.

9. The scanning gauge of claim 8 further comprising a longitudinal stepper motor means operatively coupled with the scan element for effecting longitudinal movement, a sweep motor means operatively coupled with the scan element for effecting sweeping movement, the floating mount means permitting two-dimensional movement of the sensor head on the scan element for maintaining constant engagement of the relatively movable probes with the trailing edge of the one vane and the convex surface of the adjacent vane during operation of the longitudinal stepper motor means and sweep motor means.

10. The scanning gauge of claim 9 further comprising longitudinal limit switch means for terminating operation of the longitudinal motor means when the scan element approaches a radial end of the throat and sweep limit switch means for terminating operation of the sweep motor means in both clockwise and counterclockwise directions and limiting sweeping rotation of the scan element to a selected angular sector relative to its axis of rotation.

11. The scanning gauge of claim 10 wherein the longitudinal stepper motor means is operatively coupled with the scan element by an elongated screw element and the sweep motor means is operatively coupled with the scan element by a rack and pinion assembly.

12. The scanning gauge of claim 1 further comprising relatively movable probes on the sensor head for engaging the trailing edge of the one vane and the convex surface of the adjacent vane, and floating mount means permitting two-dimensional movement of the sensor head on the scan element for maintaining constant engagement of the relatively movable probes with the trailing edge of the one vane and the convex surface of the adjacent vane.

13. The scanning gauge of claim 12 further comprising longitudinal limit switch means for terminating operation of the longitudinal motor means when the scan element approaches a radial end of the throat and sweep limit switch means for terminating operation of the sweep motor means in both clockwise and counterclockwise directions and limiting sweeping rotation of the scan element to a selected angular sector relative to its axis of rotation.

14. A scanning gauge for measuring the effective open area of a radially extending throat formed between vanes secured together at their ends, comprising
   guide means,
   locating means for positioning the guide means relative to the trailing edges of the vanes forming the throat,
   scanning means arranged for longitudinal and sweeping movement on the guide means to respectively permit travel radially along the throat for assessing radial length of the throat and rotation about an axis generally parallel to the trailing edge of one vane for assessing the minimal dimensional opening between the one trailing edge and a convex surface of the adjacent vane along the length of the throat, and
   means responsive to longitudinal and sweeping movement of the scanning means for determining the open area of the throat between the vanes.

15. The scanning gauge of claim 14 wherein the scanning means comprises relatively movable probe means for respectively engaging the trailing edge of the one vane and the convex surface of the adjacent vane during longitudinal and sweeping movement of the scanning means, the means for determining open area comprising means for assessing relative spacing between the probe means.

16. The scanning gauge of claim 15 further comprising a longitudinal motor means and a sweep motor means for effecting longitudinal and sweeping movement of the scanning means, the means for determining open area comprising computer means operatively coupled with the longitudinal motor means and operatively coupled with the transducer means for assessing relative spacing between the probe means.

17. The scanning gauge of claim 16 wherein the computer means is also operatively coupled with the sweep motor means and comprises means for regulating longitudinal and sweeping movement of the scanning means.

18. The scanning gauge of claim 14 further comprising means for initiating sweeping movement of the scanning means at a selected number of sections along the radial length of the throat.

19. The scanning gauge of claim 14 wherein the means for determining open area of the throat is a computer means operatively coupled with the scanning means.

20. The scanning gauge of claim 19 wherein the computer means further comprises means for regulating sweeping movement of the scanning means.

21. The scanning gauge of claim 20 wherein the computer means further comprises means for regulating longitudinal movement of the scanning means.

22. The scanning gauge of claim 21 further comprising stepper means operatively coupled with the scanning means for controlling its longitudinal and sweeping movement and operatively coupled with the computer means.

23. The scanning gauge of claim 19 further comprising stepper means operatively coupled with the scanning means for controlling its longitudinal and sweeping movement and operatively coupled with the computer means.

24. The scanning gauge of claim 14 further comprising stepper means operatively coupled with the scanning means for controlling its longitudinal and sweeping movement and oepratively coupled with the means for determining the open area of the throat.

25. The scanning gauge of claim 14 wherein the locating means are adjustable to facilitate positioning of the guide means relative to the trailing edges of the vanes.

26. The scanning gauge of claim 14 wherein the locating means are replaceable to facilitate positioning of the guide means relative to a variety of vanes.

27. The scanning gauge of claim 14 wherein the locating means further comprise a stabilizing means for engaging an additional vane associated with the vanes forming the throat.

28. The scanning gauge of claim 14 further comprising means for limiting longitudinal movement of the scanning means adjacent one radial end of the throat.

29. The scanning gauge of claim 14 further comprising means for limiting sweeping movement of the scanning means.

30. The scanning gauge of claim 14 further comprising means for limiting both clockwise and counterclockwise sweeping movement of the scanning means within a selected angular sector relative to its axis of rotation.

31. A method for measuring the effective open area of a radially extending throat formed between vanes secured together at their ends, comprising the steps of
   longitudinally traversing a scanning means along a radial dimension of the throat for assessing radial length of the throat,
   rotating the scanning means in sweeping movement about an axis generally parallel to the trailing edge of one vane for assessing the minimal dimensional opening between the one trailing edge and a convex surface of the adjacent vane along the length of the throat, and
   monitoring longitudinal movement of the scanning means and the minimal dimensional openings along the length of the throat and determining therefrom the area of the throat.

32. The method of claim 31 wherein the scanning means comprises a relatively movable probe means for respectively engaging the trailing edge of the one vane and the convex surface of the adjacent vane during longitudinal and sweeping movement of the scanning means.

33. The method of claim 32 wherein longitudinal movement of the scanning means is effected by a longitudinal motor means and sweeping movement of the scanning means is effected by a sweep motor means, the open area of the throat being determined by a computer means operatively coupled with the longitudinal motor means and a transducer means for assessing the minimal dimensional openings along the length of the throat.

34. The method of claim 33 further comprising the step of regulating operation of the sweep motor means and longitudinal motor means by the computer means.

35. The method of claim 31 further comprising the step of determining the open area of the throat by a computer means, operating the computer means for regulating sweeping movement of the scanning means and also operating the computer means for regulating longitudinal movement of the scanning means.

* * * * *